US007959392B2

(12) United States Patent
Cooley

(10) Patent No.: US 7,959,392 B2
(45) Date of Patent: Jun. 14, 2011

(54) U-NUT FASTENER ASSEMBLY

(75) Inventor: Brock T. Cooley, Bloomer, WI (US)

(73) Assignee: Illinois Tool Works Inc., Glenview, IL (US)

( * ) Notice: Subject to any disclaimer, the term of this patent is extended or adjusted under 35 U.S.C. 154(b) by 143 days.

(21) Appl. No.: 12/407,620

(22) Filed: Mar. 19, 2009

(65) Prior Publication Data

US 2009/0285651 A1 Nov. 19, 2009

Related U.S. Application Data

(60) Provisional application No. 61/054,031, filed on May 16, 2008.

(51) Int. Cl.
*F16B 39/28* (2006.01)

(52) U.S. Cl. .................. 411/332; 411/174

(58) Field of Classification Search .......... 411/436, 411/437, 970, 172, 174, 175, 332
See application file for complete search history.

(56) References Cited

U.S. PATENT DOCUMENTS

| 2,986,059 | A | * | 5/1961 | Duffy et al. ............... 411/437 |
| 3,368,444 | A | * | 2/1968 | Holton ...................... 411/531 |
| 3,570,361 | A | * | 3/1971 | Tinnerman ................ 411/437 |
| 3,999,583 | A | | 12/1976 | Nelson ..................... 151/41.75 |
| 4,347,636 | A | * | 9/1982 | Capuano ..................... 470/25 |
| 4,674,931 | A | | 6/1987 | Schwind et al. .......... 411/175 |
| 4,676,706 | A | * | 6/1987 | Inaba ........................ 411/175 |
| 4,720,225 | A | | 1/1988 | Burt ......................... 441/329 |
| 4,911,594 | A | * | 3/1990 | Fisher ....................... 411/437 |
| 5,026,235 | A | * | 6/1991 | Muller et al. ............. 411/523 |
| 6,010,289 | A | * | 1/2000 | DiStasio et al. .......... 411/174 |
| 6,102,639 | A | * | 8/2000 | DiStasio .................... 411/299 |
| 6,336,779 | B1 | * | 1/2002 | Jakob et al. .............. 411/175 |
| 7,182,563 | B2 | * | 2/2007 | Wimmer et al. .......... 411/174 |

FOREIGN PATENT DOCUMENTS

| DE | 100 63 011 A1 | 7/2002 |
| GB | 2 183 769 A | 6/1987 |

OTHER PUBLICATIONS

International Search Report and Written Opinion for PCT/US2009/039407.

* cited by examiner

*Primary Examiner* — Gary Estremsky
(74) *Attorney, Agent, or Firm* — Mark W. Croll; Paul F. Donovan

(57) ABSTRACT

A U-nut fastener assembly includes a U-nut fastener including a first arm member, a second arm member formed unitarily with the first arm member, a bite portion formed unitarily between the first and second arm portions such that the first arm member, the second arm member, and the bite portion are oriented to form a substantially U-shape. The nut includes a single helical thread having a proximal end and a distal end that are separated by a longitudinal gap. The U-nut assembly also includes a fastener device adapted to be received within the U-nut fastener. The single helical thread has a proximal end and a distal end and a gap disposed between the proximal and distal ends. The U-nut assembly is molded from a plastic material to include an anti-reverse feature that inhibits the fastener device from loosening with respect to the U-nut fastener. The anti-reverse feature is also adapted to provide a tactile indication to an operator installing the U-nut assembly.

12 Claims, 6 Drawing Sheets

U-NUT FASTENER ASSEMBLY

CROSS REFERENCE TO RELATED APPLICATION

This Non-Provisional Application claims benefit to U.S. Provisional Application Ser. No. 61/054,031 filed on May 16, 2008, the complete subject matter of which is expressly incorporated herein in its entirety.

BACKGROUND OF THE INVENTION

The present invention relates generally to fasteners, and more particularly to U-nut fasteners. U-nut fasteners are used within the automotive and other industries for mounting various components, such as, for example, modules, door panels, hinges, and the like, upon support panels, plates, beams, and the like. U-nut fasteners include a pair of arms coupled together to form a U-shaped spring clip. One conventional U-nut fastener is fabricated by stamping the U-nut from a metallic material. The conventional metallic U-nut fastener includes an internally threaded sleeve or nut member which is integrally formed upon a second one of the arms of the U-shaped spring clip. The internally threaded sleeve is adapted to receive a threaded metallic screw or similar type fastener which is passed through an aperture defined within the support plate or panel.

One drawback associated with conventional stamped metallic U-nut fasteners is that they are typically fabricated using metallic material that is prone to corrosion. To reduce corrosion, conventional metallic U-nut fasteners may be coated with a corrosion resistant material to increase the operational life of the U-nut fastener. However, fabricating U-nut fasteners using a metallic material that may experience corrosion and coating the U-nut fasteners with a corrosion resistant material increases the cost of manufacturing the U-nut fasteners.

Another conventional U-nut is fabricated from a molded plastic material. The plastic U-nut is substantially similar to the metallic U-nut, one difference being that the plastic U-nut includes a non-threaded boss that is adapted to receive a threaded metallic screw. To install the metallic screw into the non-threaded boss, the metallic screw is driven into the plastic boss to form the threads within the plastic boss. This method of installing the screw into the plastic U-nut may cause a premature failure of the molded plastic U-nut. For example, during use, the stress in the plastic, caused by the metallic screw installation, forces the plastic to relax, an effect known as creep. This creep coupled with the uncontrollable vibration induced into the U-nut, such as when the U-nut is installed on a vehicle, may cause the screw to loosen and become disengaged from the U-nut. To reduce stress in the plastic U-nut caused by creep, it has been suggested to mold the plastic U-nut to include multiple threads such that the metallic screw does not cut its own threads into the plastic U-nut, thus reducing stress on the plastic U-nut which may cause creep. However, it is relatively difficult and time consuming to mold a plastic U-nut that includes multiple threads. More specifically, after the molding process is completed, additional time and tools are required to remove the molding material formed within the multiple threads without damaging the threads. For example, an additional tool may be required to remove unwanted material within the plastic threads. Additionally, during installation, since the operator may continue to rotate the screw after the screw has reached the end of its design travel. Since the U-nut is fabricated from a plastic material that is softer than the metallic screw, the operator may be unaware that the screw has reached the end of its design travel and continue rotating the screw. This continued rotation may cause the plastic U-nut to fracture or otherwise fail.

A need remains for a U-nut fastener that is economical to manufacture, that includes a prevailing torque or vibration resistance feature, that is able to prevent an over-torque condition from occurring and thus prevent the threaded fastener from being damaged during installation or operation, and that is also fabricated from a material that resists corrosion or a non-metallic material to prevent corrosion.

SUMMARY OF THE INVENTION

In one embodiment, a U-nut fastener assembly is provided. The U-nut fastener assembly includes a U-nut fastener including a first arm member, a second arm member formed unitarily with the first arm member, and a bite portion formed unitarily between the first and second arm portions such that the first arm member, the second arm member, and the bite portion are oriented to form a substantially U-shape. The nut includes a single helical thread having a proximal end and a distal end that are separated by a longitudinal gap. The U-nut assembly also includes a fastener device adapted to be received within the U-nut fastener. The single helical thread has a proximal end and a distal end and a gap disposed between the proximal and distal ends. The U-nut assembly is molded from a plastic material to include an anti-reverse feature that inhibits the fastener device from loosening with respect to the U-nut fastener. The anti-reverse feature is also adapted to provide a tactile indication to an operator installing the U-nut assembly.

In another embodiment, a U-nut fastener for use with a U-nut fastener assembly is provided. The U-nut fastener includes a first arm member, a second arm member formed unitarily with the first arm member, a bite portion formed unitarily between the first and second arm portions such that the first arm member, the second arm member, and the bite portion are oriented to form a substantially U-shape. The nut includes a single helical thread having a proximal end and a distal end that are separated by a longitudinal gap. The U-nut fastener is molded from a plastic material to include an anti-reverse feature that inhibits a fastener device from loosening with respect to the U-nut fastener. The anti-reverse feature is also adapted to provide a tactile indication to an operator installing a U-nut assembly.

Other features and advantages of the invention will become apparent to those skilled in the art upon review of the following detailed description, claims and drawings in which like numerals are used to designate like features. For example, according to various embodiments of the invention, the threaded fastener can be configured to accommodate different sized panels.

DETAILED DESCRIPTION OF THE INVENTION

Figure 1:
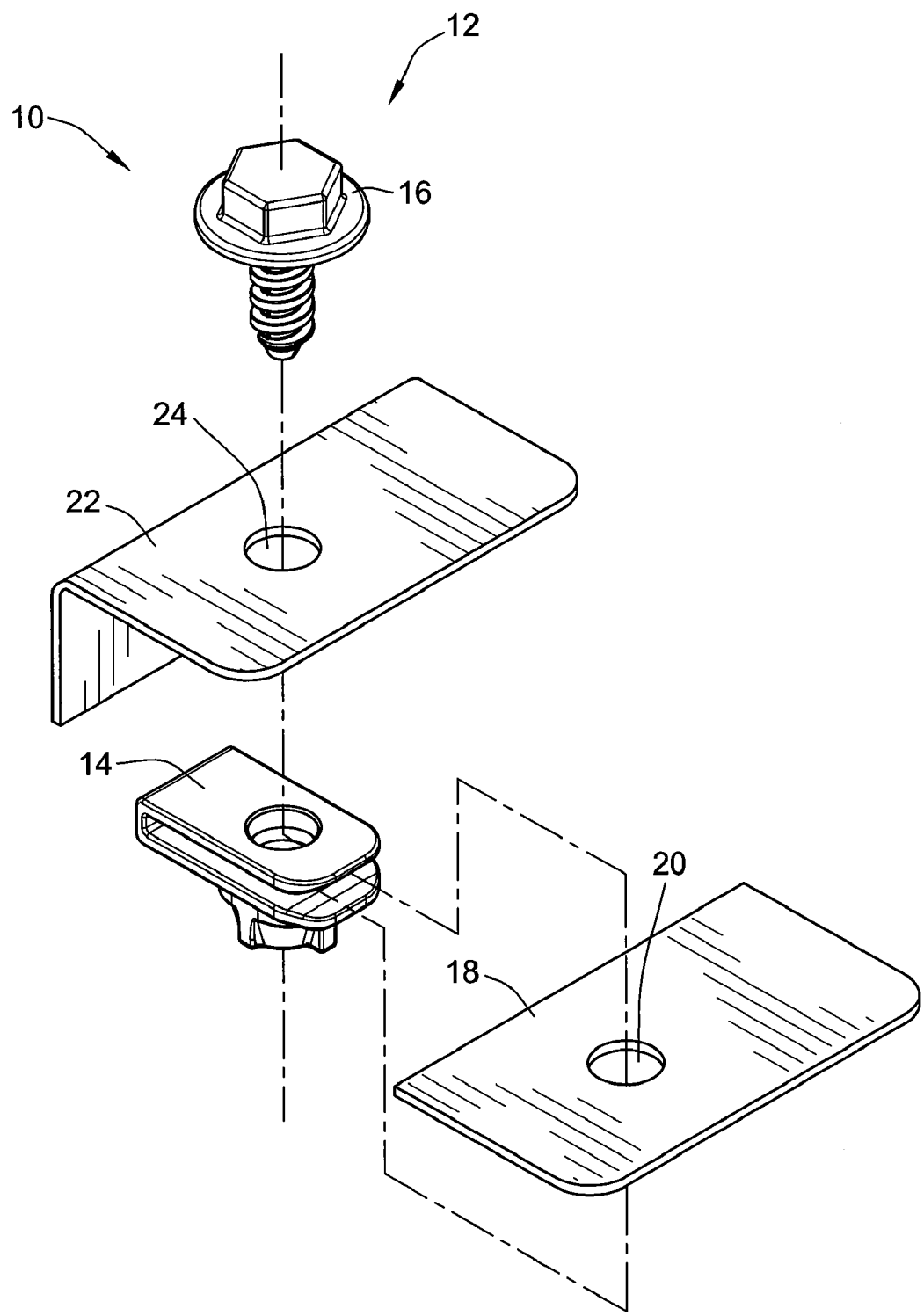
FIG. 1 is a top perspective view of an exemplary assembly that includes at least one exemplary U-nut fastener assembly shown in a first installation position in accordance with an embodiment of the present invention.

FIG. 1 illustrates an exemplary assembly 10 in a first installation position. The assembly can be any number of different assemblies, but for illustrative purposes, can be thought of as a vehicle component that is fastened to a vehicle. The assembly 10 includes at least one exemplary U-nut fastener assembly 12 in accordance with an embodiment of the present invention. Although the invention is described in connection with a vehicle component, the embodiments of the U-nut assembly described herein are capable of use in other applications, and a U-nut adapted to couple a component to a vehicle is noted as an example of one such application. The U-nut fastener assembly 12 includes a molded plastic U-nut fastener 14 and a molded plastic fastener device 16, such as a screw or bolt. The assembly 10 also includes a primary panel 18 that has an opening 20 extending therethrough, and a secondary panel 22 that has an opening 24 extending therethrough.

Figure 2:
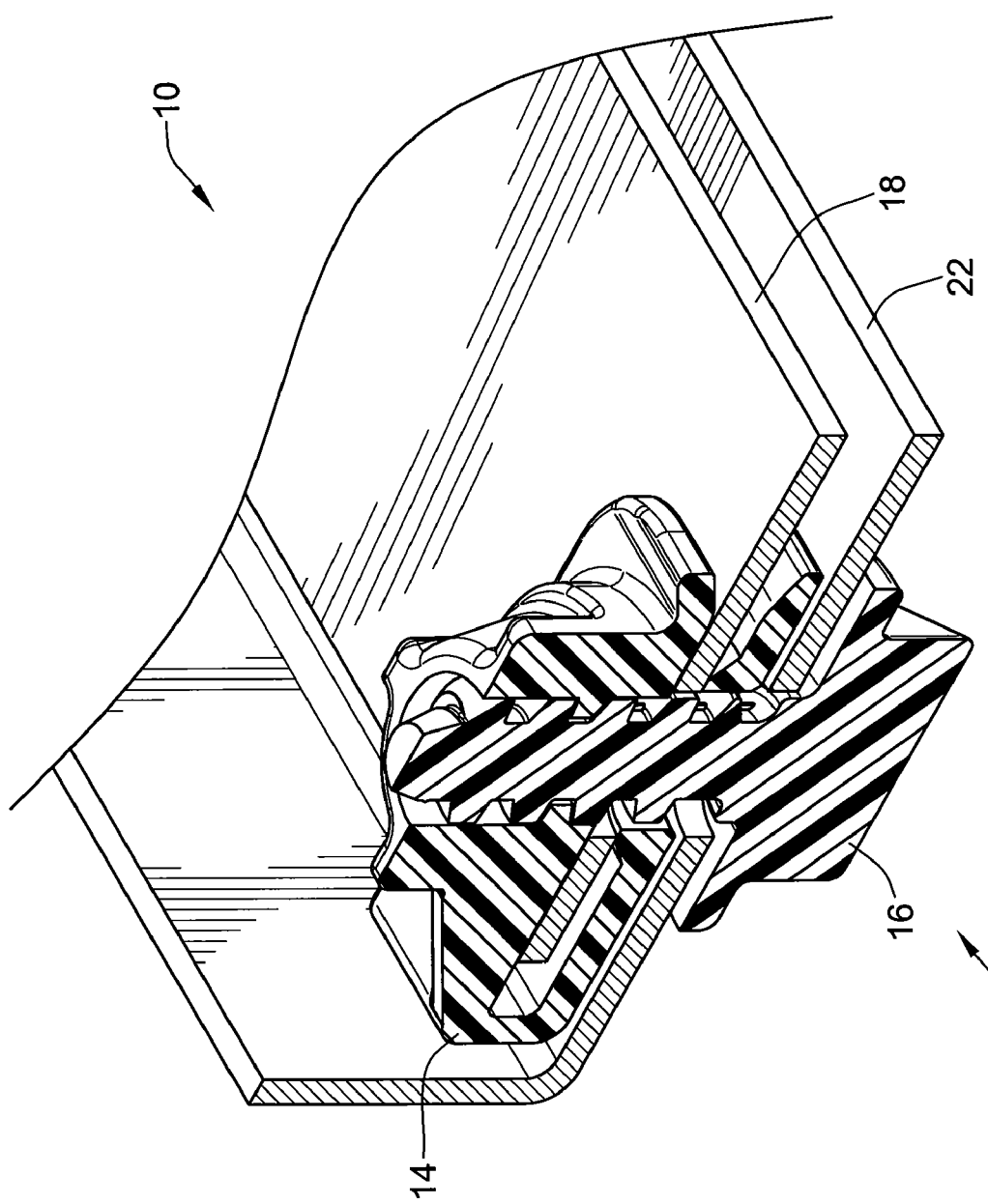
FIG. 2 is a bottom perspective view of the exemplary assembly shown in FIG. 1 in a second or installed position in accordance with an embodiment of the present invention.

FIG. 2 a cross-sectional view of the exemplary assembly 10, shown in FIG. 1, in a second or installed position. During assembly, the U-nut fastener 14 is secured to the primary panel 18 such that the primary panel 18 is disposed between portions of the U-nut fastener 14 and such that a pair of openings extending through the U-nut fastener 14 is substantially aligned with the primary panel opening 20. The fastener device 16 is then inserted through the secondary panel opening 24, through the first U-nut opening, through the primary panel opening 20 and into the second U-nut opening. The fastener device 16 is then tightened to couple the primary panel 18 to the secondary panel 22 as shown in FIG. 2.

Figure 3:
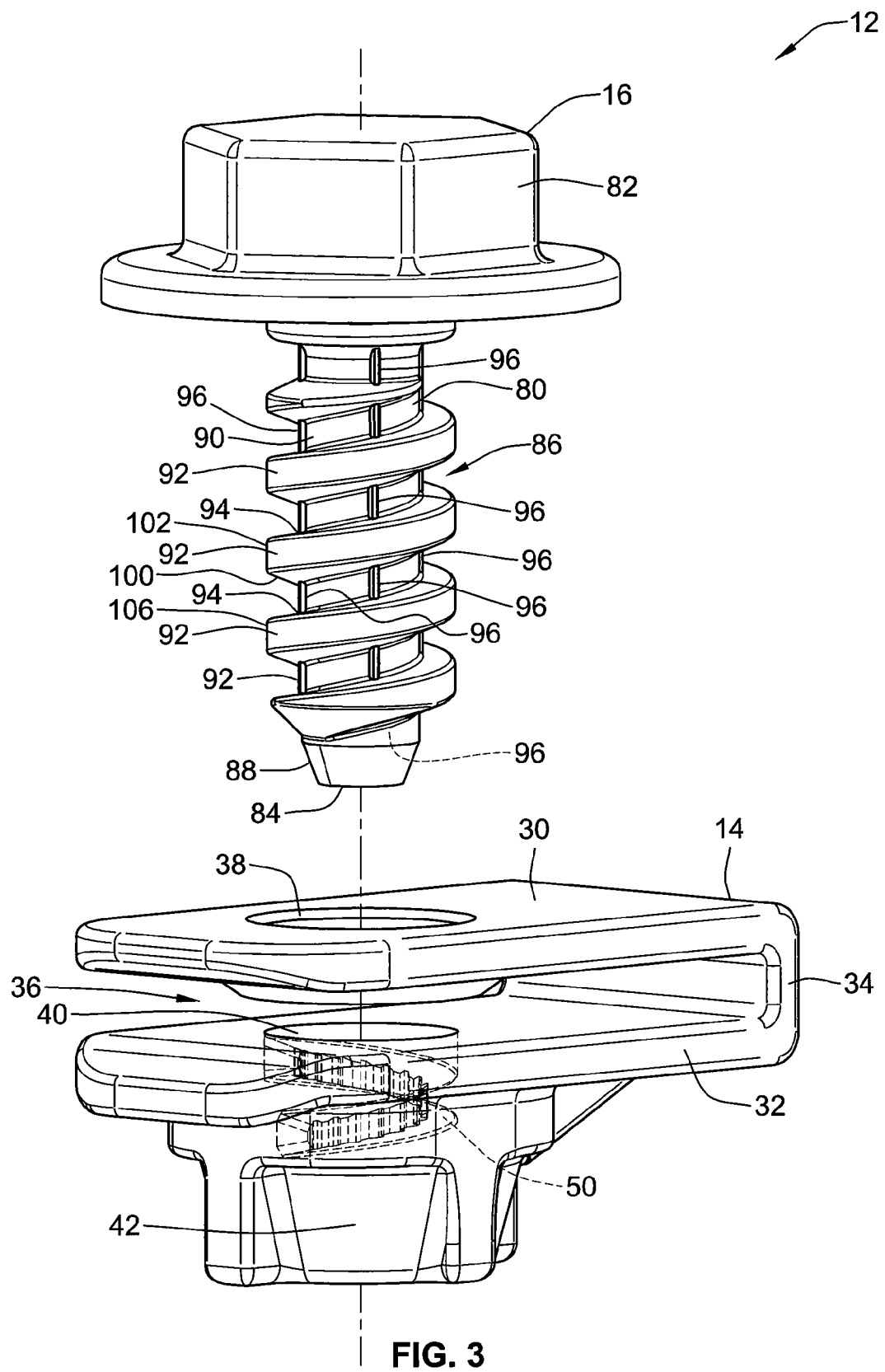
FIG. 3 is an exploded view of the exemplary U-nut fastener assembly shown in FIG. 1 in accordance with an embodiment of the present invention.

FIG. 3 is an exploded view of the exemplary U-nut fastener assembly 12 shown in FIG. 1 in accordance with an embodiment of the present invention. In the exemplary embodiment, the U-nut fastener assembly 12 is fabricated using a corrosion resistant or corrosion proof material. In the exemplary embodiment, the U-nut fastener assembly 12, all the components included therein, is fabricated using a plastic material.

As discussed above, the U-nut fastener assembly 12 includes the U-nut fastener 14 and the fastener device 16. The U-nut fastener 14 includes a first arm member 30, a second arm member 32, and an intermediate folded bite portion 34 that is integrally formed with and connects the first and second arm members 30 and 32. The U-nut fastener 14 has a substantially U-shaped configuration with the first and second arm members 30 and 32 disposed substantially parallel to each other and forming a gap 36 there between. In the exemplary embodiment, the first arm member 30 may be slightly inclined with respect to the second arm member 32 to enable the U-nut fastener 14 to clamp or grip a work piece, such as the primary panel 18, within the gap 36 and thereby facilitate installation of the U-nut fastener assembly 12. The first arm member 30 has a central aperture 38 defined therethrough. The second arm member 32 has a central aperture 40 defined therethrough. The aperture 38 is substantially aligned with the aperture 40 to enable the fastener device 16 to be inserted through both the aperture 38 and aperture 40. The U-nut fastener 14 also includes a nut 42. The nut 42 is integrally formed with the second arm member 32, and thus is also integrally formed with the intermediate folded bite portion 34 and the first arm member 30.

Figure 4A:
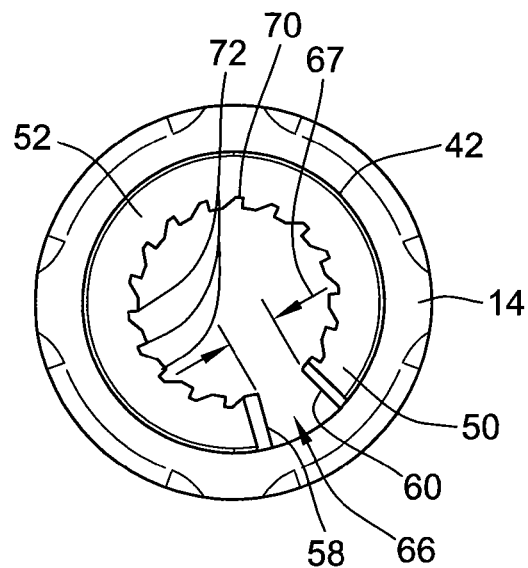
FIG. 4A is top view of the U-nut fastener shown in FIG. 3 in accordance with an embodiment of the present invention.
Figure 4B:
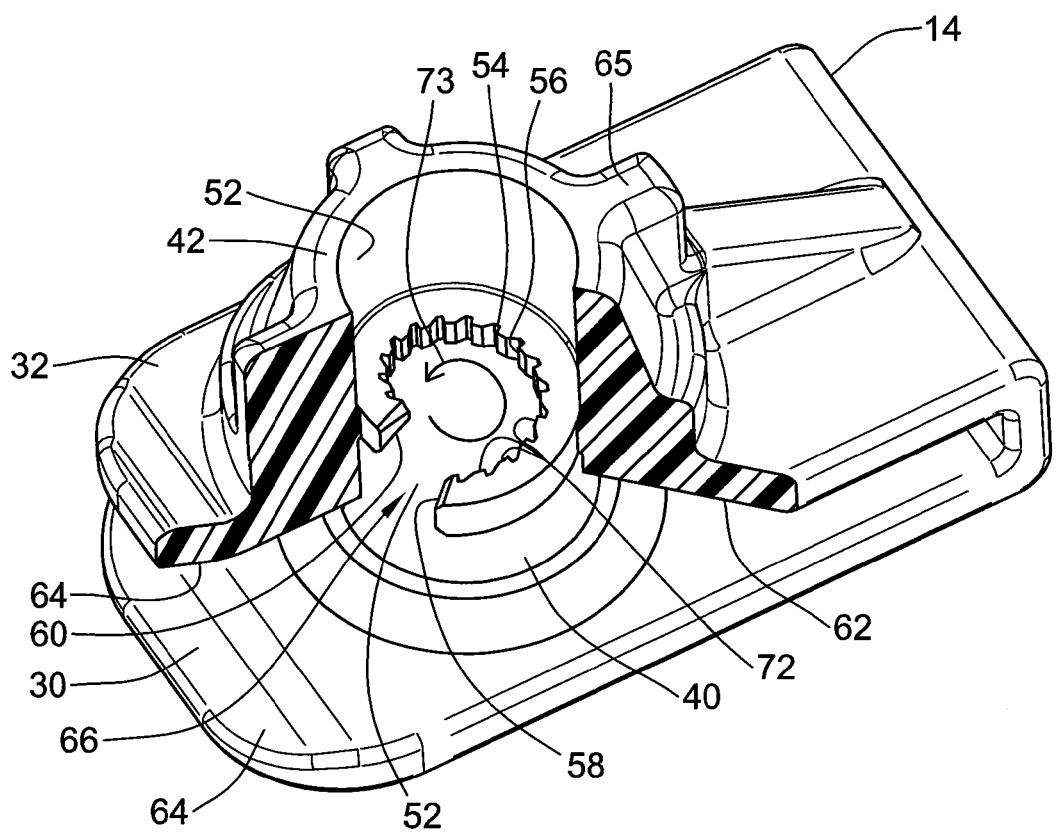
FIG. 4B is a top perspective view of the U-nut fastener shown in FIG. 3 in accordance with an embodiment of the present invention.
Figure 5:
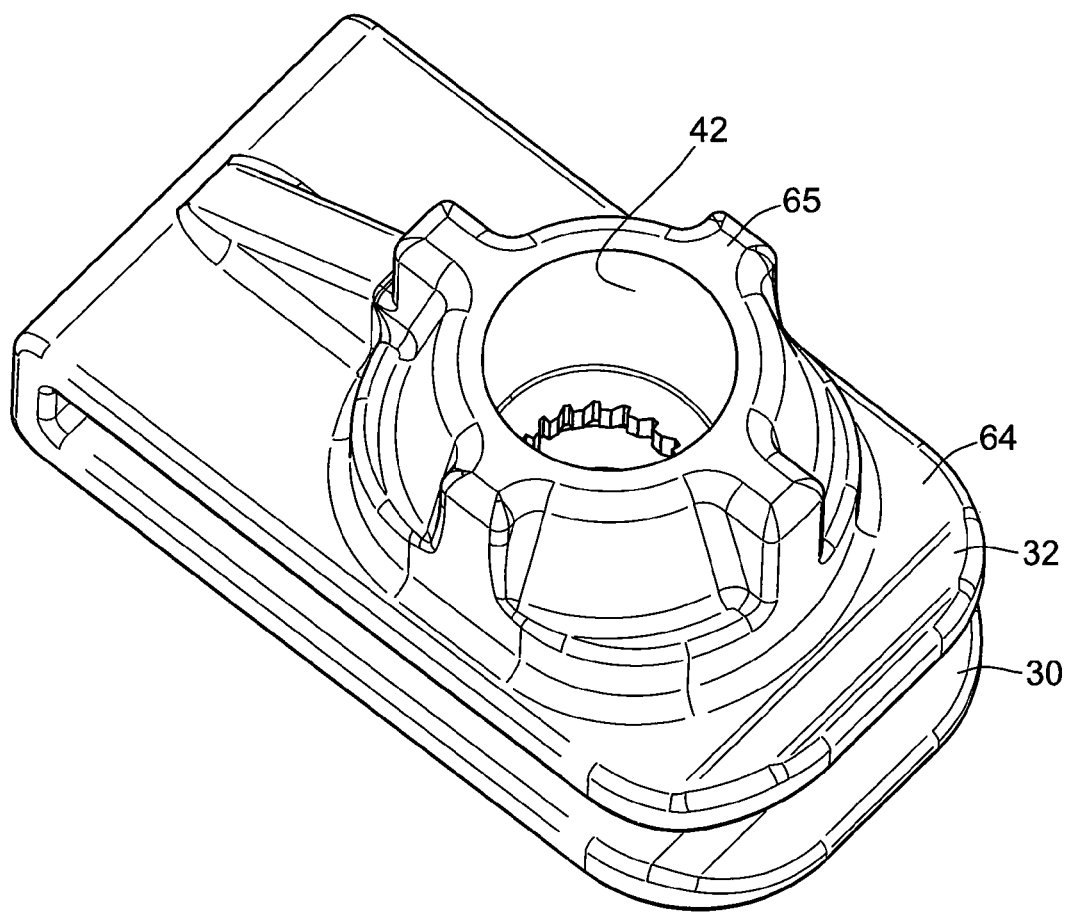
FIG. 5 is a bottom perspective view of the exemplary U-nut fastener shown in FIGS. 4A and 4B in accordance with an embodiment of the present invention.

The U-nut fastener 14 is now discussed in more detail in FIGS. 4A, 4B, and 5. FIG. 4A is top view of the U-nut fastener 14. FIG. 4B is a top perspective view of the U-nut fastener 14. FIG. 5 is a bottom perspective view of the exemplary U-nut fastener 14 shown in FIGS. 4A and 4B in accordance with an embodiment of the present invention. As discussed above, the U-nut fastener 14 includes an integral nut 42 that is adapted to receive the fastener device 16 shown in FIG. 3. Referring to FIGS. 4A and 4B, in the exemplary embodiment the nut 42 includes a thread 50 having a unique profile to enable the nut 42 to interact with the fastener device 16. The configuration of the thread 50 also enables the U-nut fastener 14 to be fabricated using a unique molding process as is discussed in more detail below.

In the exemplary embodiment, the thread 50 has a helical pitch that is substantially similar to a helical pitch of the corresponding fastener device 16. As shown in FIGS. 4A and 4B, the thread 50 is a partial thread that extends less than 360 degrees circumferentially around an interior surface 52 of the nut 42. The thread 50 includes only a single thread crest 54 and a single thread root 56. The thread 50 also includes a proximal end 58 and a distal end 60. The thread proximal end 58 is disposed proximate to a proximal end 62 of the nut 42 which is coplanar with an upper surface 64 of the second arm member 32. As shown in FIG. 5, the thread distal end 60 is disposed between the proximal end 58 and a distal end 65 of the nut 42. Referring again to FIGS. 4A and 4B, in the exemplary embodiment, the thread distal end 60 is separated from the thread proximal end 58 by a predetermined longitudinal distance or gap 66.

As discussed above, it may be difficult for an installer to determine when a conventional screw is properly threaded into a conventional U-nut fastener. As such, in the exemplary embodiment, the U-nut fastener 14 also includes an anti-reversing assembly 70. In the exemplary embodiment, shown in FIGS. 4A and 4B, the anti-reversing assembly 70 is embodied as a plurality of teeth 72 that are formed in the crest of thread 50 that interact or cooperate with a plurality of ribs that are formed on the U-nut fastener 14, discussed in more detail below. The teeth 72 extend approximately from the proximal end 58 of thread 50 to approximately the distal end 60 of the thread 50. In the exemplary embodiment, the teeth 72 form a substantially saw-tooth configuration. More specifically, the teeth 72 are biased in a direction 73 to facilitate tightening the fastener device 16 with respect to the U-nut fastener 14. The angle of the teeth 72 is set such that the fastener device 16 encounters a first amount of torque when the fastener device 16 is tightened with respect to the U-nut fastener 14. Additionally, when it is desired to remove the fastener device 16, the teeth 72 encounter a second amount of torque that is greater than the first amount of torque. As such, the teeth 72 are configured such that lower torque is used to screw the fastener device 16 into the U-nut fastener 14 and an increased amount of torque is used to remove the fastener device 16 from the U-nut fastener 14.

The exemplary fastener device 16 is now discussed in more detail. Referring again to FIG. 3, as discussed above, the fastener device 16 is adapted to be used with the U-nut fastener 14 and therefore forms a portion of the U-nut fastener assembly 12. In the exemplary embodiment, the fastener device 16 includes a shank 80 having a head 82 at one end thereof and a distal tip or end 84 at an opposite end thereof. In the exemplary embodiment, the head 82 is adapted to receive a wrench. Optionally, the head 82 may have a slot formed therein to receive a screwdriver. Those skilled in the art will understand that the head 82 may be otherwise configured with a cavity for receiving a Phillips screwdriver, a torx driver, a hexagonal wrench or the like. Moreover, the outer peripheral shape of the head 82 may be configured for engagement by a wrench or socket.

In the exemplary embodiment, the fastener device 16 also includes a thread 86 that is disposed in a helical pattern along an exterior surface of the shank 80. In the exemplary embodiment, the fastener device 16 is a molded plastic component and the thread 86 is formed during the molding process. The thread 86 includes a distal end 88 that is located proximate to the distal tip 84. The thread 86 extends along the length of the shank 80 from the distal tip 84 at least partially towards the head 82. The thread 86 also includes a proximal end 90. It should be realized that the distal end 88 of the thread 86 is disposed sufficiently near the distal tip 84 to enable the fastener device 16 to threadably engage the U-nut fastener 14.

In the exemplary embodiment, the thread 86 follows a straight line helical path within the helical pattern. More specifically, the thread 86 is formed having a single helical pitch. For example, the thread 86 includes a plurality of thread crests 92 and a plurality of thread roots 94, wherein the nominal distance between at least two adjacent thread crests 92 or two adjacent thread roots 94 is substantially the same.

The fastener device 16 also includes a plurality of detents or ribs 96 that are formed unitarily with the shank 80 and thus are formed unitarily with the fastener device 16. More specifically, the fastener device 16 includes a plurality of ribs 96 that are each formed unitarily with the shank 80. In one embodiment, each rib 96 is formed at approximately 360 degree increments along the length of thread 86. In another embodiment, each rib 96 is formed at approximately 720 degree increments along the length of thread 86. In the exemplary embodiment, the each rib 96 is formed at an increment that is less than 360 degrees along the length of thread 86. For example, as shown in FIG. 3, in the exemplary embodiment, each rib 96 extends from a root 100 of a thread segment 102 to an adjacent root 104 of an adjacent thread segment 106. Moreover, in the exemplary embodiment shown in FIG. 3, the ribs 96 are disposed at 60 degree increments, e.g. six ribs 96 are disposed every 360 degrees along the length of the thread 86. Accordingly, since the ribs 96 are formed on the shank 80 at approximately 60 degree intervals, the ribs 96 are substantially aligned along an axial length of the shank 80. It should be realized that placing a rib at every 60 degree interval is exemplary, and that the fastener device may include additional or fewer ribs 96 than shown in FIG. 3. For example, the ribs 96 may be disposed at 30 degree intervals, 90 degree intervals, 120 degree intervals, 180 degree intervals, etc. along the length of the thread 86.

Figure 6:
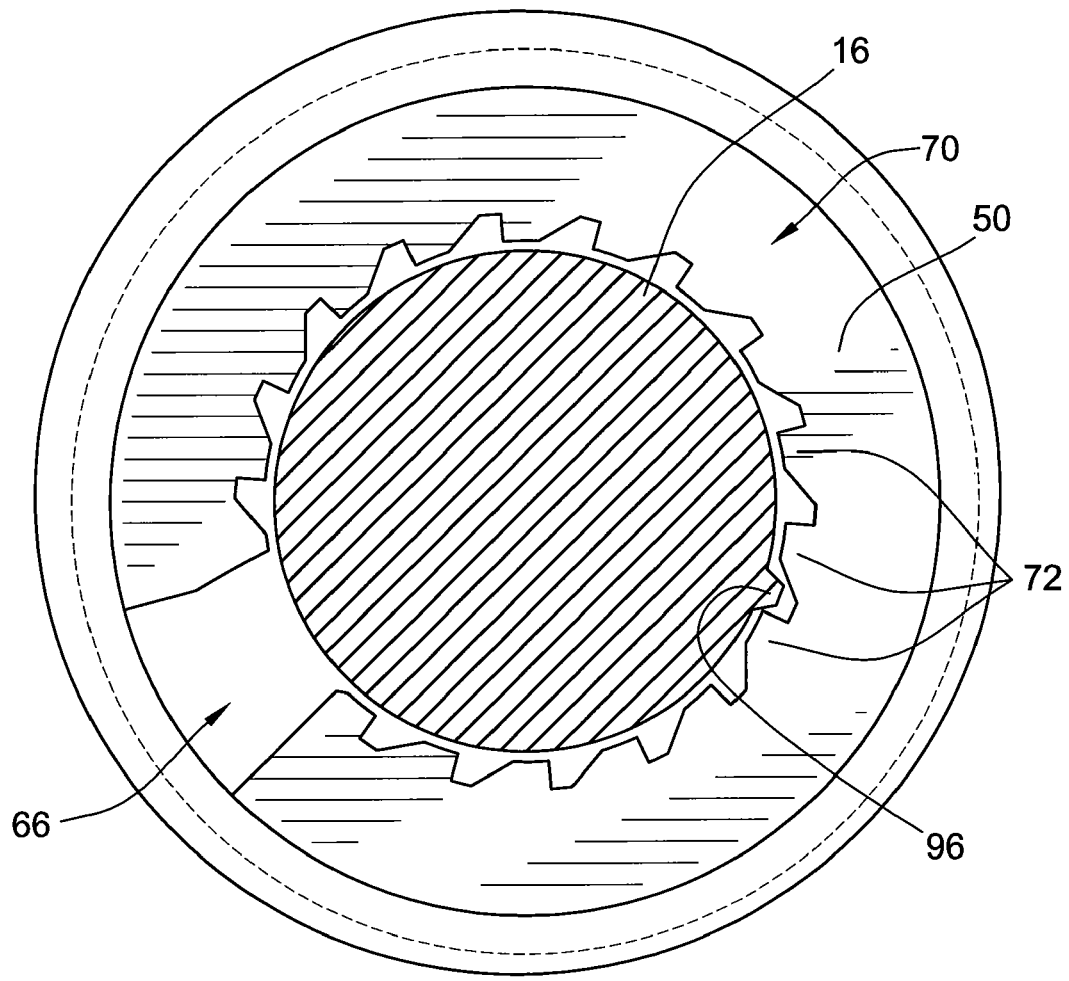
FIG. 6 is top sectional view of a portion of the U-nut fastener shown in FIG. 3 in accordance with an embodiment of the present invention Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

FIG. 6 is top sectional view of a portion of the U-nut fastener shown in FIG. 3 in accordance with an embodiment of the present invention including the anti-reversing assembly 70. In the exemplary embodiment, the anti-reversing assembly 70 includes the plurality of teeth 72 that are formed in the crest of thread 50 and the ribs 96 formed on the fastener device 16. During operation, the teeth 72 interact with the ribs 96 to substantially inhibit the fastener device 16 from rotating or unscrewing from the U-nut fastener 14.

The operation of the U-nut fastener assembly 12 is now discussed with respect to FIG. 2. As shown in FIG. 2 during installation, the U-nut fastener 14 is secured to the primary panel 18 such that the primary panel 18 is disposed between portions of the U-nut fastener 14 and such that a pair of openings extending through the U-nut fastener 14 is substantially aligned with the primary panel opening 20 as discussed above. The fastener device 16 is then inserted through the secondary panel opening 24, through the first U-nut opening, through the primary panel opening 20 and into the second U-nut opening. The fastener device 16 is then tightened to couple the primary panel 18 to the secondary panel 22.

As discussed above, an operator may over-tighten and thus fracture a conventional plastic U-nut. Accordingly, as shown in FIG. 6, the anti-reversing assembly 70 also functions as a tactile indicator that allows an operator to either feel or hear the operation of the U-nut assembly 12. For example, during operation, the ribs 96 formed in the fastener device 16 cooperate with the plurality of teeth 72 formed on U-nut fastener thread 50 to form the anti-reversing assembly 70. When the fastener device 16 is tightened with respect to the U-nut fastener 14, the ribs 96 engage the teeth 72 to provide a tactile indication to an operator that the fastener device 16 is being tightened with respect to the U-nut fastener 14.

Moreover, in the exemplary embodiment, the gap 66 may also be used as a tactile indicator to inform an operator when the fastener device 16 has been rotated 360 degrees or one full turn with respect to the U-nut fastener 14. For example, when the fastener device 16 is rotated 360 degrees, a rib 96 will be positioned between the proximal end 58 and the distal end 60 of the thread 50. As such, the rib 96 is not engaged with a tooth 72, rather the rib 96 is disposed in the gap 66. As the fastener device 16 is again rotated, a subsequent rib 96 will engage the teeth 72 again providing a tactile indication to the operator. In this manner, the operator may ascertain each time the fastener device 16 is rotated 360 degrees with respect to the U-nut fastener 14. In the exemplary embodiment, the operator may be provided guidelines to indicate the required amount of revolutions required to properly torque the fastener device 16 with respect to the U-nut fastener 14. For example, based on a prior knowledge, the operator may know to rotate the fastener device 16 four complete revolutions. In this case, the operator rotates the fastener device 16 through four rotations based on the stopping and starting of the tactile indication. In this manner, the anti-reversing assembly 70 provides a tactile indication to the installer that the fastener device 16 has been rotated to the proper installation position.

During operation, the ribs 96 interfere with the notches 76 a controlled amount thereby creating a certain torque due to sliding friction. More specifically, the ribs 96 allow for the creation and control of prevailing torque between the fastener device 16 and the U-nut fastener 14. The prevailing torque enabled by the ribs 96 also enable the U-nut fastener assembly 12 to compensate for vibration characteristics, of a vehicle for example, without self-adjusting and/or loosening.

The fabrication of the U-nut fastener 14 is now discussed. During fabrication, a blank representing the U-nut fastener to be fabricated is installed in a mold assembly (not shown). The mold assembly includes mold halves that are clamped together using the injection molding machine. The injection molding machine exerts pressure on mold assembly and injects a molding material into the mold to form the U-nut fastener 14. As discussed above, the U-nut fastener 14 includes the gap 66 that is disposed between the proximal and distal ends 58 and 60 of the thread 50. During fabrication, the gap 66 allows for an improved steel condition in the mold therefore extending or maximizing the life of the mold. It is generally desirable to reduce or eliminate any corner-to-corner contact points within the mold assembly. For example, during the molding operation, the corner-to-corner contact points rub or make contact with each other when the mold is assembled and/or disassemble. Repeated contact causes the mold to wear and thus reduces the life of the mold.

In the exemplary embodiment, described herein, the gap 66 eliminates at least one corner-to-corner contact point in the mold. More specifically, referring again to FIG. 4A, in one exemplary embodiment, a width 67 of the gap 66 is between approximately 0 degrees and less than 5 degrees, e.g. 0 degrees>width 67≧5 degrees. In the exemplary embodiment, the width 67 is approximately 3 degrees such that the mold corners are also separated by approximately 3 degrees. This 3 degree separation in the mold reduces corner-to-corner contact during assembly and/or disassembly, and thus increases the operational life of the mold. After the molding process is completed, the mold is removed to expose the U-nut fastener. As discussed above, if a U-nut fastener were to be fabricated to include multiple threads, specialized tooling would be required to remove the material located in the threads. The specialized tooling would also require additional time to remove the molding material formed within the multiple threads without damaging the threads. However, in this case, when the fabrication of the U-nut fastener 16 is completed, the mold may simply be removed without the use of specialized tools or additional time to remove material from the thread. More specifically, because, the U-nut fastener 16 includes only a single thread, when the mold is removed, both sides of the thread 50 are exposed. Thus no further time or tools are required to remove material to expose the thread 50.

Described herein is a U-nut fastener assembly that includes a molded plastic U-nut fastener and a molded plastic fastener device. The U-nut fastener includes a single toothed helical thread to reduce the time and costs of fabricating the U-nut fastener. Moreover, the fastener device includes an anti-rotation or anti-reversing device to substantially inhibit the fastener device from loosening with respect to the U-nut fastener. The anti-rotation device includes ribs that are disposed between the thread that mate with the teeth in the U-nut fastener. During operation, the teeth and ribs cooperate to form a ratchet connection and to improve against back-out.

During assembly, the U-nut fastener may be snapped onto a plastic or metal panel providing an anchor point for an additional component(s) to be secured via the fastener device. When the required torque has been met, the anti-rotation device provides a method of locking the U-nut fastener assembly into a final position substantially eliminating loosening due to vibration. If the fastener device is required to be separated from the U-nut fastener, a torque can be applied to overcome the holding force of the anti-rotation device.

The U-nut fastener described herein therefore substantially eliminates the effect of creep caused by known U-nut fasteners. Moreover, the U-nut fastener assembly described herein substantially alleviates the stress induced in conventional U-nut fasteners by using a molded thread coupled with the molded screw. A molded thread combination allows for a much more aggressive thread because the additional stresses are not forced into the U-nut by driving a metal screw that is forming its own threads. Additionally, by using a plastic U-nut fastener assembly, the need for special coating to prevent corrosion and scratching paint during installation, causing corrosion is eliminated.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A U-nut fastener assembly comprising:
   a U-nut fastener comprising a first arm member, a second arm member formed unitarily with the first arm member, a bight portion formed unitarily between the first and second arm portions such that the first arm member, the second arm member, and the bight portion are oriented to form a substantially U-shape; and a nut formed unitarily with the second arm member, said nut comprising a single helical thread that extends partially around an inner surface of said nut, said single helical thread having a proximal end and a distal end; and a gap disposed between said proximal and distal ends; and
   a fastener device adapted to be received within said U-nut fastener;
   wherein said single helical thread comprises a plurality of teeth adapted to engage at least one detent formed on said fastener device.

2. A U-nut fastener assembly in accordance with claim 1 wherein the fastener device is adapted to be threaded into said nut using said single helical thread.

3. A U-nut fastener assembly in accordance with claim 1 wherein said teeth are configured to engage at least one rib formed on said fastener device at sixty degree increments to enable the fastener device to move in sixty degree increments when the fastener device is installed in said U-nut fastener.

4. A U-nut fastener assembly in accordance with claim 1 wherein said gap has a width that extends between approximately 0 degrees and approximately 5 degrees.

5. A U-nut fastener assembly in accordance with claim 1 wherein said single helical thread extends approximately 360 degrees around an interior surface of said nut.

6. A U-nut fastener assembly in accordance with claim 1 wherein said fastener device comprises a plurality of ribs within a 360 degree increment along a length of said fastener device, said plurality of ribs enable said fastener device to move in predetermined increments when said fastener device is installed in said U-nut fastener.

7. A U-nut fastener assembly comprising:
   a U-nut fastener comprising a first arm member, a second arm member formed unitarily with the first arm member, a bight portion formed unitarily between the first and second arm portions such that the first arm member, the second arm member, and the bight portion are oriented to form a substantially U-shape; and a nut formed unitarily with the second arm member, said nut comprising a single helical thread that extends partially around an inner surface of said nut, said single helical thread having a proximal end and a distal end; and a gap disposed between said proximal and distal ends; and a fastener device adapted to be received within said U-nut fastener;

wherein said single helical thread comprises a plurality of teeth, said teeth configured to engage at least one rib formed on said fastener device to enable said fastener device to move by degrees when said fastener device is installed in said U-nut fastener.

8. A U-nut fastener assembly in accordance with claim 7 wherein said teeth are configured such that a first amount of torque is used to install said fastener device within said U-nut fastener and a second different torque is used to remove said fastener device from said U-nut fastener.

9. A U-nut fastener assembly in accordance with claim 7 wherein said teeth and said rib are adapted to provide a tactile indication to an operator when said fastener device is rotated.

10. A U-nut fastener assembly comprising:

a U-nut fastener comprising a first arm member, a second arm member formed unitarily with the first arm member, a bight portion formed unitarily between the first and second arm portions such that the first arm member, the second arm member, and the bight portion are oriented to form a substantially U-shape; and a nut formed unitarily with the second arm member, said nut comprising a single helical thread that extends partially around an inner surface of said nut, said single helical thread having a proximal end and a distal end; and a gap disposed between said proximal and distal ends; and a fastener device adapted to be received within said U-nut fastener;

wherein said first arm member, said second arm member, said bight portion, said nut, and said fastener device are each fabricated from a plastic material.

11. A U-nut fastener assembly in accordance with claim 10 wherein said gap has a width that is sufficient to prevent corner-to-corner contact in a mold utilized to fabricate said U-nut fastener.

12. A U-nut fastener assembly in accordance with claim 10 wherein said first arm member, said second arm member, said bight portion, and said nut are each fabricated in a single molding operation.

* * * * *